R. M. FREEMAN.
FOLDABLE BODY FOR MOTOR VEHICLES.
APPLICATION FILED JAN. 3, 1918.
1,329,894.
Patented Feb. 3, 1920.
3 SHEETS—SHEET 1.
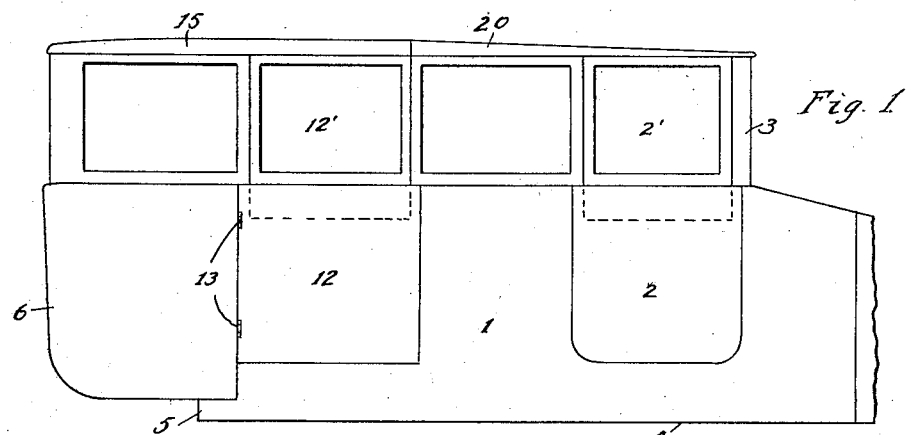
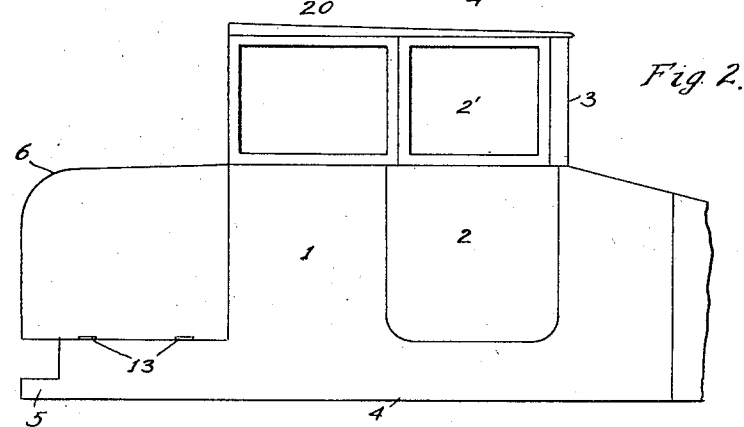
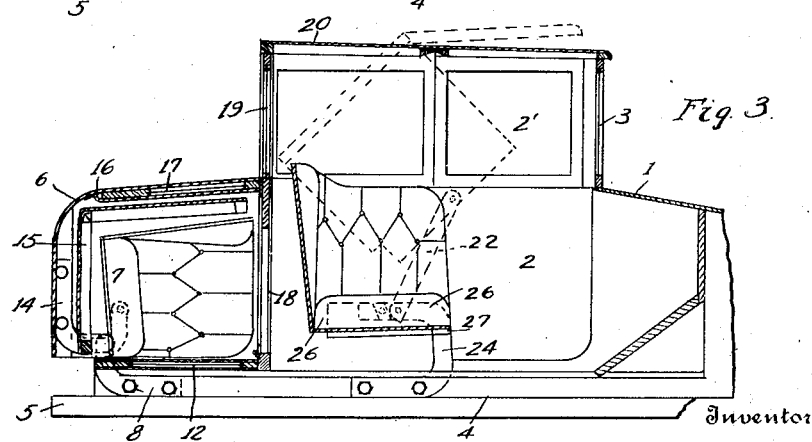
Witness
L. S. Woodhull
Inventor
Russell M. Freeman
By B. F. Wheeler
Attorney

R. M. FREEMAN.
FOLDABLE BODY FOR MOTOR VEHICLES.
APPLICATION FILED JAN. 3, 1918.

1,329,894.

Patented Feb. 3, 1920.
3 SHEETS—SHEET 2.

Witness
L. S. Woodhull

Inventor
Russell M. Freeman

By B. F. Wheeler
Attorney

R. M. FREEMAN.
FOLDABLE BODY FOR MOTOR VEHICLES.
APPLICATION FILED JAN. 3, 1918.

1,329,894.

Patented Feb. 3, 1920.
3 SHEETS—SHEET 3.

Witness
L. S. Woodhull

Inventor
Russell M. Freeman

By B. T. Wheeler
Attorney

UNITED STATES PATENT OFFICE.

RUSSELL M. FREEMAN, OF DETROIT, MICHIGAN.

FOLDABLE BODY FOR MOTOR-VEHICLES.

1,329,894.    Specification of Letters Patent.    Patented Feb. 3, 1920.

Application filed January 3, 1918. Serial No. 210,158.

*To all whom it may concern:*

Be it known that I, RUSSELL M. FREEMAN, a citizen of the United States, residing at Detroit, in the county of Wayne and State of Michigan, have invented a new and useful Foldable Body for Motor-Vehicles, of which the following is a specification.

This invention relates to motor vehicle bodies and particularly to bodies of the two-seated type of passenger carrying vehicles.

The main object of the invention is to provide a two seated body of the above class of such construction as to enable one of the seats to be readily folded, together with the body portion occupied thereby, into a compactly inclosed relation to the remaining seat so as to render the body convertible to decrease or increase the seating capacity and in such manner as to effect and present the usual form and characteristics of the standard types of double and single seated bodies known as "touring" and "roadster".

A further object is to provide in connection with such a body arrangement means by which top sections may be employed for inclosing the body in either position of adjustment of the seats and which when not required for use may be adjusted to a concealed stored position within the body about said seats.

Further objects and advantages will appear in the following description of the invention as illustrated in the accompanying drawings, in which, however, certain structural features of the top members as shown in connection with the body are substantially the same as disclosed in an application for patent on convertible vehicle body filed by me Nov. 12, 1917, Serial No. 201706, and which are not included in the present invention.

In the drawings,

Figure 1 is a side elevation of the body fully extended with top thereon forming an inclosed two-seated or "touring" type.

Fig. 2 is a side elevation of the body with rear section of top lowered into rear portion of body, which, together with rear seat, is folded forwardly upon the intermediate portion of the body forming a single seated or "roadster" type.

Fig. 3 is a central vertical longitudinal section of the body and top in the position of Fig. 2, and indicating by dotted lines an actuated position of the top section in the operation of lowering into the body.

Figure 4:
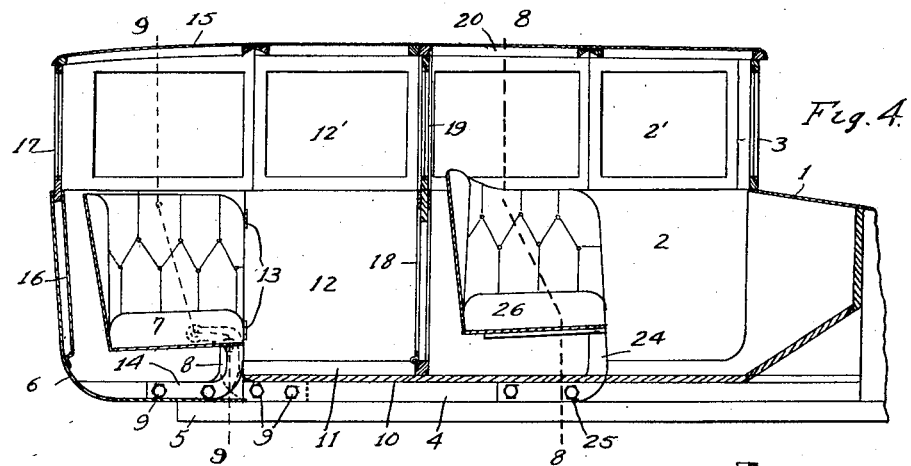
Fig. 4 is a central vertical longitudinal section through the parts in the position of Fig. 1.
Figure 5:
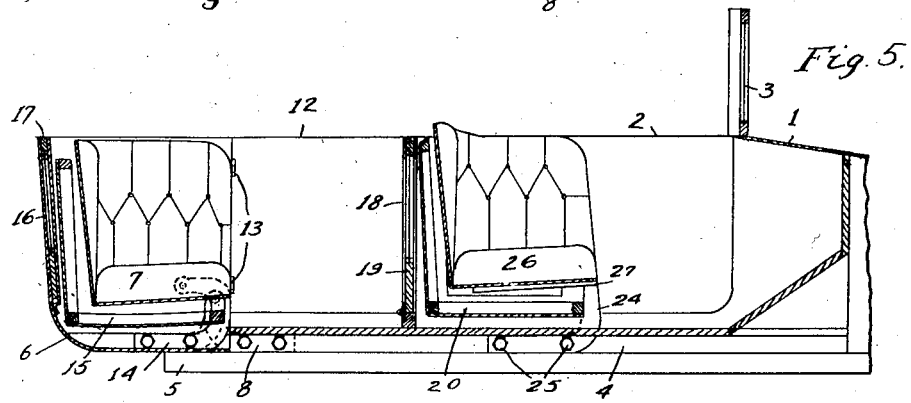
Fig. 5 is a central longitudinal section through the parts showing the top sections in the down-folded and nested position about the backs and bottoms of the seats.
Figure 6:
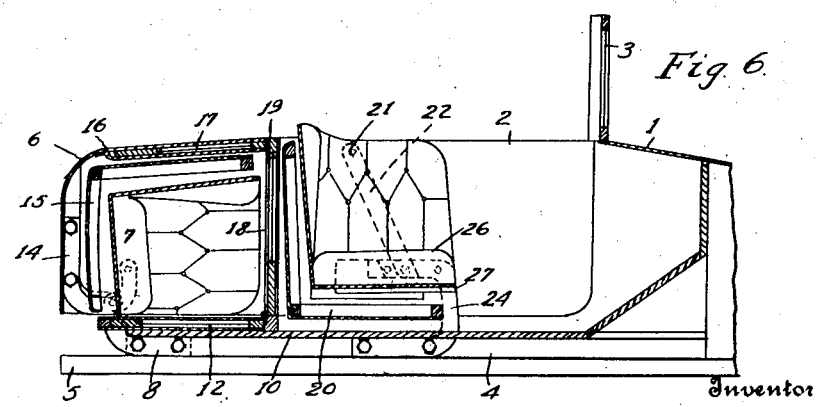
Fig. 6 is a central longitudinal section through the body folded to form a single seated or "roadster" type showing the top sections in the folded and nested position about the seat.
Figure 7:
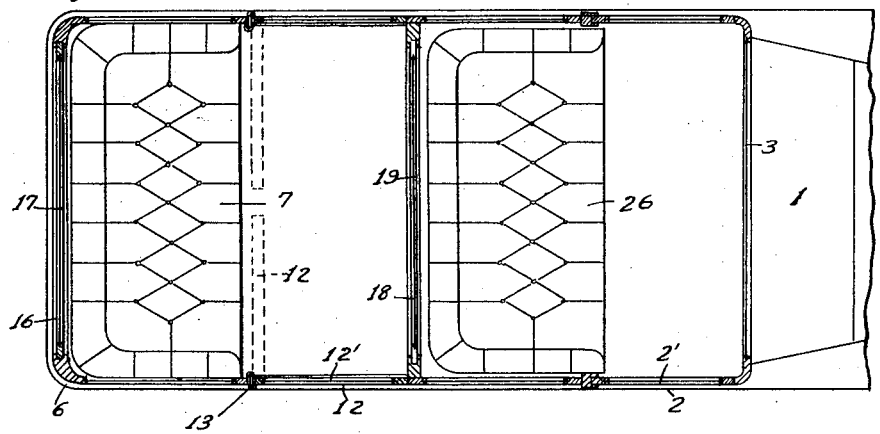
Fig. 7 is a horizontal sectional view through the top members in the position of Fig. 1 and indicating by dotted lines an inwardly swung position of the rear doors of the body.

Referring to the several parts designated by reference characters, 1 indicates the forward portion of the body having doors 2 in the sides thereof and an upstanding windshield 3 forwardly adjacent said doors, as is usual. 4 designates the side rails or sills of the frame upon which the forward portion of the body is fixedly supported, and which are provided at their rear ends with offset extensions 5 upon which the rear portion 6 of the body is supported when adjusted to the two-seated form as shown in Figs. 1, 4 and 5. The rear portion 6 which embraces the rear seat 7 is pivotally connected at its lower forward edge to the rear end of the forward portion 1 of the body by means of angular strap hinges 8, the opposed members of which are respectively secured by bolts 9 to said rear portion and to the sills 4 adjacent the extensions 5 thereof. Extending between the forward and rear body portions upon each side thereof and above the plane of the floor 10 are door sills 11 above which doors 12 are hung to swing outwardly and inwardly of the body upon double acting hinges 13 secured to the rear vertical edges thereof and to the forward edges of the rear portion of the body, and upon which said doors are adapted to swing into transverse alinement within the body and also to fold to a horizontal position between the sills 11 with the swinging of the rear body portion to the limit of its forward movement, as shown in Figs. 3 and 6. The axes of the hinges of the rear body member is such with relation to the forward edges thereof and to the upper faces of the door sills 11 that when said member is swung forwardly said edges rest upon said sills and the upper edges of this body member abut against the forward body portion closing the doorways, while the back and bottom of said rear member are brought into position to inclose and house the doors and rear end of the forward portion of the body, as shown in Fig. 2.

The seat 7 which is carried by the rear body member may be supported therein in any suitable manner, but is shown in the present case as pivotally mounted upon upstanding arms 14 secured to said member near the bottom thereof for the purpose of adjustably supporting said seat to accommodate the pivotal attachment thereto of a foldable top section 15 so as to permit said section to be folded and stored in a nested position about said seat. These last mentioned features are substantially comprised in a co-pending application for patent as before stated, and need not be further described herein.

Figure 8:
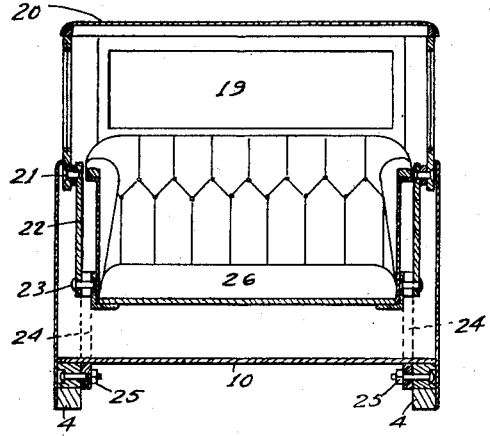
Fig. 8 is a transverse section through the body, forward seat and top section on dotted line 8—8 of Fig. 4.
Figure 9:
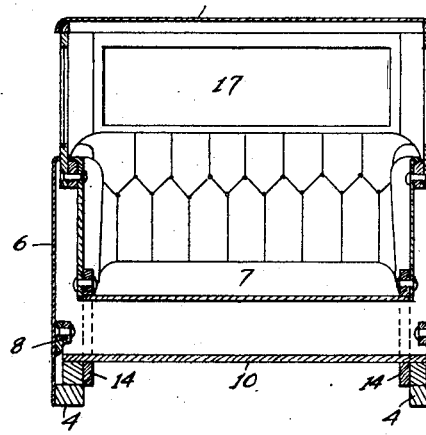
Fig. 9 is a similar section through the body, rear seat and top section on dotted line 9—9 of Fig. 4.

Formed in the back of the body member 6 is a pocket 16 for the reception of a vertically slidable window 17 adapted to be raised into engagement with the rear portion of the top, and extending transversely at the rear of the forward body portion 1 is a vertically arranged partition 18 forming a pocket for containing a window 19 slidable into engagement with the top section 20 of said body portion. Said top section 20, which is foldable and similar in construction and operation to the rear section 15, is pivotally mounted as indicated at 21 (see Fig. 8) upon the upper ends of links or arms 22 which are connected at the lower ends by pivots 23 to swing upon the upper ends of supporting arms 24 bolted as at 25 to the sills 4 of the frame.

The front seat 26 is supported upon cleats 27 secured to the arms 24 and is spaced from the partition 18 to provide clearance for the passage of the forward top section into the stored position about said seat, as shown in Figs. 5 and 6. The purpose of the swinging arms is to permit of the tilting of the forward top section as indicated by dotted position in Fig. 3, to facilitate the entrance thereof into the space between the partition 18 and the back of the seat 26 in the operation of lowering said top section.

The doors 2 and 12 may be provided with slidable windows 2' and 12' for adjustment into engagement with the respective top sections, and suitable fastenings (not shown) may be employed in connection with the adjustable parts throughout the structure for detachably securing said parts as may be required.

It will now appear from the foregoing description that a body thus constructed and equipped will be readily convertible from an inclosed to an open form, and from a double to a single seated type, in which latter position the intermediate portion of the body together with the rear doors and seat will be inclosed and housed by the rear body portion, while in both forms of adjustment the general lines and appearances characteristic of the standard types of double and single seated bodies in common use are presented.

What I claim is:

1. A vehicle body comprising a forward body section provided with a seat and having a base portion extending rearwardly thereof, a partition spaced from said seat and extending transversely of said base, a rear body section spaced from said partition and hingedly mounted on said base to fold thereon, a seat mounted in said rear body section, and doors hingedly carried by said rear section to swing inwardly thereof and to fold with said seat and rear section into close proximity to said partition.

2. A vehicle body comprising a forward body section having a rearwardly extending base and provided with a foldable top section, a partition extending transversely of said body section, a seat mounted in spaced relation to said partition and to the sides of said body to provide clearance for said foldable top section, a member slidably carried by said partition and movable into engagement with said top section, and a rear body section provided with a seat and hingedly mounted on said base to fold forwardly thereon into close proximity to said partition.

3. A vehicle body comprising a forward body section having a rearwardly extending base, a rear body section spaced from said forward section and hingedly mounted on said base to fold forwardly thereon and provided with a foldable top section, a seat mounted in said rear body section in spaced relation to the walls thereof to provide clearance for said foldable top section, a slidable member carried by said rear body section and movable into engagement with the top section thereof, and doors hingedly mounted in the space between said body sections to swing outwardly and inwardly thereof.

4. A vehicle body comprising a forward body section having a rearwardly extending base and provided with a foldable top section, a partition extending transversely of said body section, a seat mounted in spaced relation to said partition and to the sides of said body to provide clearance for said foldable top section, and a rear body section provided with a seat and hingedly mounted on said base to fold forwardly thereon into close proximity to said partition.

5. A vehicle body comprising a forward body section having a rearwardly extending base, a rear body section spaced from said forward section and hingedly mounted on said base to fold forwardly thereon and provided with a foldable top section, a seat mounted in said rear body section in spaced relation to the walls thereof to provide clearance for said foldable top section, and doors hingedly mounted in the space between said body sections to swing outwardly and inwardly thereof.

6. A vehicle body comprising a forward body section having a rearwardly extending base, a rear body section spaced from said forward section and hingedly mounted on said base to fold forwardly thereon, a seat mounted in said rear body section, a member carried by said rear section slidable into engagement with a top therefor, and a door hingedly mounted in the space between said body sections to swing outwardly and inwardly thereof.

In testimony whereof I sign this specification.

RUSSELL M. FREEMAN.